United States Patent [19]

Lee

[11] 4,048,263
[45] Sept. 13, 1977

[54] RUBBER MODIFIED FIRE RETARDANT POLYMER COMPOSITIONS

[75] Inventor: Yoon C. Lee, Springfield, Mass.

[73] Assignee: Monsanto Company, St. Louis, Mo.

[21] Appl. No.: 644,492

[22] Filed: Dec. 29, 1975

[51] Int. Cl.$^2$ .................... C08L 27/00; C08L 47/00
[52] U.S. Cl. ................................ 260/890; 260/4 R; 260/45; 260/75 B; 260/892; 260/897 B; 260/899
[58] Field of Search ............ 260/889, 887, 892, 45.75, 260/45.95, 45.7, 4, 879, 897 B

[56] References Cited

U.S. PATENT DOCUMENTS

| | | | |
|---|---|---|---|
| 2,894,926 | 7/1959 | Jacobson | 260/890 |
| 3,766,249 | 10/1973 | Howell et al. | 260/476 R |

FOREIGN PATENT DOCUMENTS 1,402,958   8/1975   United Kingdom .................. 206/293

*Primary Examiner*—J. Ziegler
*Attorney, Agent, or Firm*—W. J. Farrington; J. C. Logomasini; S. M. Tarter

[57] ABSTRACT

Disclosed herein are rubber modified fire retardant polymer compositions based on interpolymers of styrene, maleic anhydride and a brominated monomer such as tribromophenyl acrylate, which have been formulated with various additives. These compositions, which have a UL-94 rating of at least V-1, are especially useful for use in radio and T.V. cabinets, furniture, appliance housings and other similar applications.

10 Claims, No Drawings

RUBBER MODIFIED FIRE RETARDANT POLYMER COMPOSITIONS

BACKGROUND OF THE INVENTION

1. Field of the Invention

The present invention relates to rubber modified fire retardant polymer compositions comprising an interpolymer of styrene, maleic anhydride and a copolymerizable brominated comonomer such as tribromophenyl acrylate, which have been formulated with a halogenated fire retardant additive, a metal oxide and a smoke suppressant.

2. Description of the Prior Art

Polystyrene (PS) and styrene-maleic anhydride copolymers (SMA) are well known and are widely used in the prior art. Polymers which are prepared using a comonomer such as acrylonitrile with the styrene and styrene-maleic anhydride polymers are also known in the art. These polymers tend to burn readily and are not generally recommended for use in those applications requiring fire retardant polymers.

There exists a need in the art for rubber modified styrene-maleic anhydride based molding compositions which can be made fire retardant. This need is accented by the increasing number of laws and regulations relating to the fire retardant properties of polymers used as molding compositions in the manufacture of furniture, such as radio and television cabinets, tables, chairs, appliance housings, and other related uses.

SUMMARY OF THE PRESENT INVENTION

The above need in the prior art is fulfilled by rubber modified fire retardant compositions of the present invention which comprise:

A. from 48 to 94 percent by weight based on the total weight of the molding composition of a rubber modified polymer which is the interpolymerization product of:
  1. from 55 to 85 percent by weight of a styrene monomer;
  2. from 5 to 25 percent by weight of a maleic anhydride monomer; and
  3. from 10 to 25 percent by weight of a brominated monomer selected from the group consisting of bromophenyl acrylates, bromophenyl methacrylates, bromoneopentyl acrylate and bromoneopentyl methacrylates, with the proviso that the amount of bromine in the polymer is at least 6 percent by weight; wherein the amount of rubber in the polymer is in the range of from 1 to 30 percent by weight based on the weight of the polymer;

B. from 3 to 12 percent by weight based on the total weight of the molding composition of a metal oxide;

C. from 3 to 25 percent by weight based on the total weight of the molding composition of a smoke suppressant which is selected from the group consisting of smoke suppressing hydrates, carbonates and borates; and D. from 0 to 15 percent by weight of a brominated aromatic fire retardant additive.

DESCRIPTION OF THE PREFERRED EMBODIMENTS

The styrene-type monomers used in the present invention include styrene, alpha-methylstyrene, and halogenated styrenes such as o—, p—, and m-chlorostyrenes, o—, p—, and m-bromostyrenes, etc. The amount of styrenetype monomer used in the present invention is from 55 to 85 percent by weight based on the weight of the total polymer composition. Up to 30 percent by weight of the styrene monomer may be replaced by other suitable monomers such as acrylonitrile, methacrylonitrile, methylmethacrylate, etc.

The amount of maleic anhydride used in the present invention is in the range of from 5 to 25 percent by weight, preferably 7 to 20 percent by weight based on the total polymer composition. The maleic anhydride monomer used may be replaced in whole or in part by monochloromaleic anhydride and bromomaleic anhydride. The dichloromaleic anhydride was found to be unsuitable because of excessive brittleness in the polymer which also had poor processability. The maleic anhydride monomers used contribute to lower smoke levels for the polymer, raise the heat distortion temperature of the polymer and reduce the tendency of the polymer to drip during the flame tests.

The brominated comonomers which are copolymerized with styrene and maleic anhydride include brominated phenyl acrylates, brominated phenyl methacrylates, brominated neopentyl acrylates and brominated neopentyl methacrylates wherein the monomer contains from 1 to 5 bromine atoms per molecule. The preferred brominated monomers include tribromophenyl acrylate, tribromophenyl methacrylate, tribromoneopentyl acrylate and tribromoneopentyl methacrylate.

The amount of brominated monomer used is selected so as to provide an interpolymer with a bromine content of at least 6 percent by weight. In order to obtain this minimum bromine level, it will be necessary to use brominated monomer in amounts in the range of from 10 to 25 percent, preferably 10 to 20 percent, by weight, when using the preferred tribromo monomers. Preferably, the total amount of halogen in molding compositions prepared from the interpolymers of the present invention is at least 10 percent by weight. This amount of halogen can be due solely to the brominated monomers used. Alternately, at least 6 percent by weight of the halogen can be due to the brominated monomers used and the balance can be contributed by halogenated fire retardant additives or halogenated rubber modifiers as is described in greater detail below.

The use of a brominated comonomer insures dispersion of the bromine throughout the polymer composition and avoids the problems encountered when trying to obtain a uniform dispersion of fire retardant additives into the polymer composition. Moreover, when using the comonomer approach there is more latitude for the use of additives in the polymer for specific purposes without losing too much of the polymer properties.

The polymers of the present invention are prepared by conventional mass or solution polymerization techniques. Aqueous polymerization methods are not suitable because the water would hydrolyze the anhydride group.

The polymers of the present invention may be further modified with various additives in order to enhance fire retardant properties and/or smoke evolution properties. A description of the preferred additives is set forth below.

HALOGEN ADDITIVES

The polymers of the present invention may be formulated with additives which provide additional halogen content to the polymer composition. These halogenated fire retardant additives are generally well known in the art. The preferred additives are those which contain one or more bromine atoms attached to an aromatic nucleus. One such class of these compounds may be represented by the following general formula:

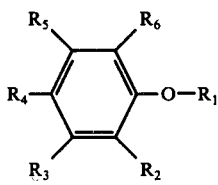

in which $R_1$ is an aromatic group which may be brominated and/or chlorinated or a straight chain or branched alkyl group containing from 2 to 12 carbon atoms and may contain an OH group, and $R_2$ and $R_6$ stand for a member of the group consisting of hydrogen, chlorine and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether and decabromodiphenyl ether. The halogen atoms of these diaromatic ethers may be distributed in any arrangement on the aromatic rings.

Examples of suitable aromatic-aliphatic ethers are the 2-ethylhexyl-, n-octyl, nonyl-, butyl-, dodecyl- and 2,3-dioxopropyl ethers of tribromophenyl, tribromochlorophenyl and tribromodichlorophenyl. The most preferred compound is decabromodiphenyl ether.

Other aromatic bromine compounds are described in U.S. Pat. Nos. 3,833,538, 3,849,369; British Pat. No. 1,372,120 and West German Pat. Publications 2,328,517, 2,328,520, and 2,328,535, which are incorporated herein by reference. Other suitable aromatic bromine compounds are well known to those skilled in the art or will become obvious upon reading the present specification.

The amount of halogenated fire retardant additives is in the range of from 0 to 15 percent by weight, preferably 4 to 12 percent by weight in order to provide additional halogen to the compositions.

SYNERGISTS

Examples of synergists used in combination with the halogen in order to obtain improved fire retardant properties include metal oxides such as $Sb_2O_3$, $Bi_2O_3$, $MoO_3$, $SnO_2$, $WO_3$, and the like. The preferred metal oxide is $Sb_2O_3$. These metal oxides (especially antimony oxide) function as synergists in improving the efficiency of the halogen in imparting flame retardancy to the above mentioned polymers. The amount of metal oxide used with the polymers of this invention will be from 1 to 15 percent by weight, preferably 3 to 12 percent by weight, based on the total weight of the formulated composition.

SMOKE SUPPRESSANTS

The polymers of the present invention may be further modified with smoke suppressants in order to enhance fire retardant properties and/or smoke evolution properties. Examples of smoke suppressants would include hydrates, carbonates and borates such as alumina trihydrate, aluminum hydroxide sodium carbonate hydrate, magnesium carbonate, hydrated magnesia, hydrated calcium silicate, hydrated calcium borate, calcium carbonate, and magnesium borate. One of the preferred smoke suppressants is dawsonite [Na Al $CO_3(OH)_2$] which is available commercially from Alcoa. Mixtures of the above smoke suppressants are also effective. The amount of smoke suppressant used in this invention will be from 3 to 25 percent by weight, preferably from 5 to 20 percent by weight based on the total weight of the formulated composition.

In addition to acting as smoke suppressants, the magnesium carbonate and/or magnesium borate are also believed to react with the sodium oxide generated by the dawsonite thereby keeping the sodium oxide from reacting with and tying up the fire retarding halogens. Thus, when using small amounts of the carbonate or borate, e.g., from 3 to 15 percent by weight based on the formulated composition, in combination with the dawsonite, more of the halogen in the composition will be more readily available to function as a flame retardant. Alternately, when using dawsonite and other such compounds, one can increase the amount of halogen used in order to compensate for that which may be tied up by the dawsonite.

The preferred smoke suppressant system is a combination of magnesium carbonate and dawsonite wherein the ratio of magnesium carbonate to dawsonite is at least 1:1.

RUBBER MODIFIERS

The polymers of the present invention contain from 1 to 30 percent and more preferably from 5 to 20 percent by weight of a synthetic or natural rubber component. Examples of the rubber components include polymers and copolymers of butadiene, isoprene, chloroprene, as well as other rubbers such as nitrile rubbers, epichlorohydrin rubbers, acrylate rubbers, natural rubbers, and rubbery ethylene-vinyl acetate, ethylene-propylene copolymers and chlorinated polyethylene. The rubber component is used to strengthen or toughen the interpolymer of styrene/maleic anhydride and the brominated comonomer. The percent rubber referred to above is that of the rubber substrate based on the total polymer composition.

The rubbery component may be incorporated into the matrix polymer by any of the methods which are well known to those skilled in the art, e.g., direct polymerization of monomers, grafting the styrene, maleic anhydride and brominated monomers and mixtures thereof onto the rubbery backbone, forming a polyblend of a rubber graft polymer with a matrix polymer, etc.

The preferred rubber components are epichlorohydrin rubbers, polychloroprene rubbers and chlorinated polyethylene.

The polychloroprene rubber component preferred for use in the present invention is polychloroprene or a copolymer of chloroprene and at least one other monomer such as butadiene, acrylonitrile, methacrylonitrile, styrene, ring substituted halostyrene, alpha-halostyrene, ring substituted alkylstyrene, alpha-alkylstyrene, vinyl chloride, etc. The amount of comonomer used is in the range of 0 to 20 percent based on the weight of polychloroprene rubber copolymer.

Chloroprene rubbers are commercially available as solid rubbers, rubber latices (also referred to as emulsions) and solutions. The preferred polychloroprene rubbers used in the present invention are those in solid form or in organic solvent solutions as those in latex form must be recovered from the latex and dried prior to use. The chloroprene rubber used is crosslinked either before or during processing in order to maintain its particulate nature. Chloroprene rubbers are available from the E. I. duPont de Nemours and Company, Wilmington, Delaware and from Petro-Tex Chemical Corporation of Houston, Texas.

The preferred epichlorohydrin rubbers are polyepichlorohydrin and copolymers of epichlorohydrin with alkylene oxides such as ethylene and propylene oxides. These rubbers are available commercially as Hydrin Elastomers from B. F. Goodrich Chemical Company.

The rubber component is selected to provide a balance of good physical properties such as impact and gloss. Ungrafted rubber can be used in the present invention. However, polychloroprene rubber which has been grafted with a polymer composition similar to that used for the matrix polymer is preferred because the grafted polychloroprene rubber provides better dispersion of the chlorinated rubber in the polyblend. This provides better impact strength and fire retardancy properties. The solid polychloroprene rubbers are conventionally grafted by dissolving or dispersing the rubber in the monomers to be grafted onto the rubber.

The percent of monomer grafted onto the rubber is in the range of from about 10 to 100 percent by weight with 10 to 50 percent being most preferred to insure compatibility and good gloss. The percent graft is defined as the weight percent of monomers grafted onto the rubber particle, based on the weight of the rubber, e.g., 100 grams of rubber grafted with 100 grams of monomer has 100 percent of grafted monomers. Preferably, the grafted rubber has a particle size in the range of from 0.1 to 20 microns, more preferably, 1 to 10 microns for optimum gloss and toughness.

The type and amount of monomers described above in reference to the preparation of the matrix polymer are used in the grafting polymerization of the polychloroprene. It is desirable to use halogenated comonomers in the graft polymerization of the rubbers when these are used to prepare the matrix polymer.

TEST PROCEDURES

Underwriter's Laboratory UL-94 [1]

Fire retardant properties are measured using the "Test for Flammability for Plastic Materials - UL-94", Sept. 17, 1973. The test is carried out on test specimens 6 inches × ½ inches × ⅛ inches. When other sample thicknesses are used the stated thickness is given.

[1] The numerical flame spread ratings reported herein are not intended to reflect hazards presented by the presently claimed polyblends or any other materials under actual fire conditions.

The test specimen is supported from the upper end, with longest dimension vertical, by a clamp on a ring stand so that the lower end of the specimen is ⅜ inches above the top of the burner tube. The burner is then placed remote from sample, ignited, and adjusted to produce a blue flame, ¾ inches in height.

The test flame is placed centrally under the lower end of the test specimen and allowed to remain for 10 seconds. The test flame is then withdrawn, and duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-O is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus, and A. F. Robertson, "Method for Measuring Smoke from Burning Materials," Symposium on Fire Test Methods - Restraint and Smoke, 1966, ASTM STP 422, Am. Soc. Testing Mats., 1967, p. 166.

The following examples are set forth in illustration of the present invention and are not to be construed as a limitation thereof. Unless otherwise indicated all parts and percentages are by weight.

EXAMPLES 1 to 4 (Control)

Examples 1 to 4 illustrate the effect of various amounts of maleic anhydride on the smoke evolution in styrene-maleic anhydride copolymers during fire retardant tests. The polystyrene and styrene-maleic anhydride (SAN) copolymers tested are prepared by conventional techniques. These polymers are then formulated as follows:

| | |
|---|---|
| Polymer | 77 parts |
| Antimony Oxide | 4 parts |
| Decabromodiphenyl Oxide | 9 parts |
| Dawsonite | 5 parts |
| Magnesium Carbonate | 5 parts |
| | 100 parts total |

The decabromodiphenyl oxide is a conventional fire retardant additive, which is available commercially as Dow FR-300-BA from the Dow Chemical Company. The antimony oxide is a synergist for the decabromodiphenyl oxide. The dawsonite and magnesium carbonate are smoke suppressants.

The ingredients are compounded on a mill roll at temperatures in the range of 160° to 195° C. and then compression molded into test specimens using temperatures in the range of 175° to 195° C. and pressures of about 4000 to 5000 psi (281 to 351 kg/sq.cm.). The molded specimens are then tested for flame and smoke properties using the tests described above. The results of these tests are tabulated in Table I below.

TABLE I

SUMMARY OF CONTROL EXAMPLES 1 to 4

| Example | % Maleic Anhydride in Polymer | DM (1) | UL-94 Rating | Dripping Behavior | AFOT (2) |
|---|---|---|---|---|---|
| 1 Poly-Styrene | 0 | 550(284) | Fail | Drips Heavily | 35 |
| 2 SMA | 7 | 518(226) | Fail | Drips Slightly | 35 |
| 3 SMA | 14 | 472(213) | V-O | None | 2 |
| 4 SMA | 21 | 330(162) | V-O | None | 2 |

(1) The first number is under flaming while the second number in parenthesis is under non-flaming (smoldering) conditions.
(2) Approximate flame out times.

Referring to Table I above, as the amount of maleic anhydride increases from 0 to 14 percent, the UL rating and approximate flame out times (AFOT) become significantly better. In this regard the polystyrene of Example 1 and the styrene-maleic anhydride copolymer of Example 2 which contain 7 percent by weight of maleic anhydride should be compared with Examples 3 and 4 which contain 14 and 21 percent of maleic anhydride. In addition, there is less smoke evolved and less tendency for the polymer to drip when using increasing amounts of maleic anhydride.

All of the above samples contain 9 parts of a decabromodiphenyl oxide fire retardant additive, which provides 7.4 percent bromine to the composition. Even at these bromine levels Examples 1 and 2 fail the UL-94 test. However, it should be noted that when Example 1 was repeated without the dawsonite it passed the UL-94 test but dripped heavily and gave off greater amounts of smoke. Moreover, the use of halogenated fire retardant additives instead of halogenated monomers may result in non-uniform properties because of the problem of obtaining a uniform dispersion of the additives in the polymer.

EXAMPLE 5

This example illustrates a method for the preparation of the interpolymers of the present invention wherein a brominated monomer is interpolymerized with the styrene (S) and maleic anhydride (MA). A mixture of 71 parts of styrene, 14 parts of maleic anhydride and 15 parts of 2,4,6-tribromophenyl acrylate are stirred gently under a nitrogen blanket until the maleic anhydride and tribromophenyl acrylate are dissolved in the styrene monomer. The resulting solution is transferred to pyrex test tubes which are stoppered and placed in an oil bath. The solutions are polymerized for 48 hours at 80° C. followed by polymerization at 105° C. for 72 hours. It should be noted that when using larger amounts of maleic anhydride, lower polymerization temperatures are used in order to obtain better control of the reaction. The polymer is then ground, soaked in methanol for 24 hours, filtered and dried.

EXAMPLE 6

Example 5 is repeated here except that tribromoneopentyl methacrylate is used in place of the tribromophenyl acrylate used in Example 5.

The polymers prepared in Examples 5 and 6 above, which have halogen contents of about 7.9 percent by weight and three different polymers used as control samples, are formulated as follows:

| | |
|---|---|
| Polymer | 86 parts |
| Antimony Oxide | 4 parts |
| Dawsonite | 5 parts |
| Magnesium Carbonate | 5 parts |
| | 100 parts total |

The first control sample is the polystyrene homopolymer of Example 1. The second control sample is a copolymer of styrene and tribromophenyl acrylate (S/TBPA) and the third sample is a copolymer of styrene and tribromoneopentyl methacrylate (S/TBNPA), each containing 75 percent by weight of styrene and 25 percent by weight of the brominated monomer. The second and third control samples have bromine contents of about 13 percent by weight. The samples are formulated and tested as outlined above. The results of these tests are tabulated in Table II below.

TABLE II

SUMMARY OF TESTS ON EXAMPLES 5 and 6

| Example (1) | UL-94 Rating | AFOT (2) | Dripping Behavior | Dm Flaming | Dm Non-Flaming |
|---|---|---|---|---|---|
| 1st control | Fail | Burns | Drips Heavily | 462 | 255 |
| 2nd control | V-2 | 2 | Drips | 445 | 205 |
| 3rd control | V-2 | 2 | Drips | 505 | 225 |
| 5 | V-O | 2–3 | None | 464 | 178 |
| 6 | V-O | 2–2.5 | None | 509 | 177 |

(1) 1st control - polystyrene, 2nd control - S/TBPA 75/25; 3rd control - S/TBNPA 75/25.
(2) Approximate flame out times.

Referring to Table II above, Examples 5 and 6 have a higher UL-94 rating (V-O) than the second and third control samples (V-2), notwithstanding the fact that the control samples contain 25 percent by weight of the brominated monomer as compared to the 15 percent by weight in Examples 5 and 6. Moreover, Examples 5 and 6 do not drip whereas the control samples do. Note further that the samples listed in Table II above, do not contain any additional fire retardant additive. This illustrates the improved properties which are obtained with the interpolymers of the present invention.

EXAMPLES 7 and 8

These examples illustrate the use of a chlorinated rubber with the interpolymers of the present invention. A high impact polystyrene (HIPS) sample is included for control purposes. The interpolymers used in Examples 7 and 8 are the same as those used in Examples 5 and 6, respectively. Seventy-six parts of these polymers are compounded with 10 parts of Hydrin 100, a polyepichlorohydrin homopolymer which is available commercially from B. F. Goodrich Company. The rubber component is shredded and mill rolled with the matrix at temperatures in the range of from 160° C. to 195° C. The mill rolled samples are ground and formulated with 4 parts of antimony oxide, 5 parts of dawsonite and 5 parts of magnesium carbonate. The rubber modified compositions of Examples 7 and 8 contain 7.9 percent bromine and 3.8 percent chlorine for a total halogen content of 11.7 percent. The formulated samples are then compression molded and tested for flame and smoke properties. The results of these tests are tabulated in Table III below.

TABLE III
SUMMARY OF EXAMPLES 7 and 8

| Polymer (1) | HIPS Control | Example 7 | Example 8 |
|---|---|---|---|
| UL-94 Test | Fails | V-0 | V-0 |
| AFOT (seconds) | Burns | 1 | 1 |
| Dm (Flaming) | 600 | 420 | 460 |
| (nonflaming) | 290 | 191 | 181 |
| Dripping | Drips | None | None |

(1) HIPS - polystyrene contains about 9 percent by weight of a grafted butadiene styrene rubber. Example 7 - S/MA/tribromophenyl acrylate 71/14/15 percent by weight. Example 8 - S/MA/tribromoneopentyl methacrylate 71/14/15 percent by weight.

The data in Table III above indicate that the terpolymers of the present invention, which are compounded with a chlorinated rubber and other additives, have a UL-94 rating of V-O and an approximate flame out time of 1 second. In addition, these samples have better impact properties than comparable non-rubber modified polymers.

EXAMPLES 9 to 11

A matrix polymer is prepared which contains 78 percent by weight of styrene, 7 percent by weight of maleic anhydride and 15 percent by weight of tribromophenyl acrylate using the general procedures outlined above. This matrix polymer is then formulated and tested for fire and smoke properties. The formulations and test results are tabulated in Table IV below.

TABLE IV
SUMMARY OF EXAMPLES 9 to 11
COMPOSITIONS

| Parts of | Ex. 9 | Ex. 11 | Ex. 11 |
|---|---|---|---|
| Matrix Polymer | 65 | 53.9 | 53.9 |
| Hydrin 100 | 16 | 16 | 13.5 |
| Butadiene Rubber (1) | 0 | 13.2 | 13.2 |
| Sb$_2$O$_3$ | 4 | 4 | 4 |
| MgCO$_3$ | 10 | 10 | 7.5 |
| Dawsonite | 5 | 0 | 5 |
| Decabromodiphenyl oxide | 0 | 2.9 | 2.9 |
| Bromine Content (% by weight) | 6.1 | 7.4 | 7.4 |
| Chlorine Content (% by weight) | 6.1 | 6.1 | 5.1 |
| Total Halogen content (% by weight) | 12.2 | 13.5 | 12.5 |

(1) Grafted with about 100 percent by weight of styrene.

TEST RESULTS

| | | | |
|---|---|---|---|
| UL-94 | V-0 | V-0 | V-0 |
| AFOT (seconds) | 1 | 1 | 1 |
| Dm (Flaming) | 435 | 452 | 469 |
| (Non-flaming) | 253 | 345 | 281 |

Referring to Table IV above, Examples 10 and 11 illustrate the use of a butadiene-styrene type rubber in combination with a chlorinated rubber without adversely effecting the flame retardant properties of these systems.

EXAMPLE 12

The general procedure of Example 5 is repeated here to prepare an interpolymer which contains 70 percent by weight of styrene, 10 percent by weight of maleic anhydride and 20 percent by weight of tribromophenyl acrylate.

EXAMPLES 13 to 17

The interpolymer prepared in Example 12 above is formulated and tested for fire retardant properties. The formulations and test results are tabulated in Table V below.

TABLE V
SUMMARY OF FORMULATIONS AND TEST RESULTS FOR EXAMPLES 13 to 17

| Example (1) | 13 | 14 | 15 | 16 | 17 |
|---|---|---|---|---|---|
| Polymer | 68 | 63 | 68 | 63 | 58 |
| Epichlorohydrin rubber | 16 | 16 | 0 | 0 | 0 |
| Chloroprene | 0 | 0 | 16 | 16 | 16 |
| Antimony oxide | 6 | 6 | 6 | 6 | 6 |
| Magnesium carbonate | 5 | 10 | 5 | 10 | 15 |
| Dawsonite | 5 | 5 | 5 | 5 | 5 |
| % Bromine | 8.43 | 7.81 | 8.43 | 7.81 | 7.19 |
| % Chlorine | 6.13 | 6.13 | 6.40 | 6.40 | 6.40 |
| UL-94 | V-0 | V-0 | V-0 | V-0 | V-0 |
| AFOT (seconds) | <1 | <1 | <1 | <1 | <1 |
| Dm (Flaming) | 407 | 397 | 399 | 403 | 388 |
| (Non-Flaming) | 200 | 290 | 250 | 370 | 288 |
| Dripping Behavior | None | None | None | None | None |

(1) Numerial values for compositions of the formulations are parts by weight.

Referring to Table V above, the epichlorohydrin rubber used in Examples 13 and 14 is the Hydrin 100 referred to above. The polychloroprene rubber used is a solid neoprene rubber obtained from E. I. duPont de Nemours and Company. The UL-94 tests indicate the good flame retardant properties that are obtained with the compositions of the present invention.

EXAMPLE 18

The general procedure of Example 5 is repeated here to prepare an interpolymer which contains 90 percent by weight of styrene, 5 percent by weight of maleic anhydride and 5 percent by weight of tribromophenyl acrylate.

EXAMPLES 19 to 22

The polymer prepared in Example 18 above is formulated and tested for fire retardant properties. The formulations and test results are tabulated in Table VI below.

TABLE VI
SUMMARY OF FORMULATIONS AND TEST RESULTS FOR EXAMPLES 19 to 22

| Example (1) | 19 | 20 | 21 | 22 |
|---|---|---|---|---|
| Polymer | 69 | 69 | 62 | 62 |
| Epichlorohydrin rubber | 16 | 0 | 16 | 0 |
| Chloroprene rubber | 0 | 16 | 0 | 16 |
| Antimony oxide | 5 | 5 | 5 | 5 |
| Magnesium carbonate | 5 | 5 | 5 | 5 |
| Dawsonite | 5 | 5 | 5 | 5 |
| Decabromodiphenyl oxide | 0 | 0 | 7 | 7 |
| % Bromine | 2.14 | 2.14 | 7.73 | 7.73 |
| % Chlorine | 6.13 | 6.4 | 6.13 | 6.4 |
| UL-94 | Fails | Fails | V-0 | V-0 |
| AFOT (seconds) | >30 | >30 | 1 | 1 |
| Dm (Flaming) | 546 | 429 | 443 | 458 |
| (Non-flaming) | 362 | 361 | 372 | 383 |
| Dripping Behavior | None | None | None | None |

(1) Numerical values for components of the formulations are parts by weight.

Examples 19 and 20 in Table VI above show the need for having at least 6 percent by weight bromine in the interpolymers of the present invention. When using the lower level of 5 percent by weight of a brominated monomer, the particular monomer used should have a bromine content which would supply this minimum requirement. Alternately, an external source of bromine must be used.

The polymers of the present invention are useful for preparing a wide variety of molded objects such as radio and television cabinets, appliance housings, parts and components for vehicles, furniture and other related items.

Polymers of the present invention may be further modified with conventional additives and adjuvants such as fillers, plasticizers, U.V. stabilizers, heat stabilizers, antioxidants, etc. Care should be taken when formulating or compounding the polymers of the present invention so as not to adversely effect the flammability and/or smoke evolution properties of the polymers of the present invention.

What is claimed is:

1. A composition of matter comprising:
   A. from 48 to 94 percent by weight based on the total weight of the molding composition of a polyblend of:
      a. a matrix polymer of
         1. from 55 to 85 percent by weight of a styrene monomer;
         2. from 5 to 25 percent by weight of a maleic anhydride monomer; and
         3. from 10 to 20 percent by weight of a brominated monomer selected from the group consisting of bromophenyl acrylates, bromophenyl methacrylates, bromoneopentyl acrylate and bromoneopentyl methacrylates with the proviso that the amount of bromine in the polymer is at least 6 percent by weight and
      b. a rubber component wherein the amount of rubber in the polyblend is in the range of from 1 to 30 percent by weight based on the weight of the polyblend;
   B. from 3 to 12 percent by weight based on the total weight of the molding composition of a metal oxide;
   C. from 3 to 25 percent by weight based on the total weight of the molding composition of a smoke suppressant which is selected from the group consisting of smoke suppressing hydrates, carbonates and borates, and
   D. from 0 to 15 percent by weight of a brominated aromatic fire retardant additive.

2. A composition of matter as in claim 1 wherein the styrene monomer is selected from the group consisting of styrene, alpha-methyl styrene or chlorostyrene.

3. A composition of matter as in claim 2 wherein the brominated monomer contains three bromine atoms.

4. A composition of matter as in claim 2 wherein the brominated monomer is tribromophenyl acrylate.

5. A composition of matter as in claim 2 wherein the brominated monomer is tribromoneopentyl methacrylate.

6. A composition of matter as in claim 1 wherein the metal oxide is antimony oxide.

7. A composition of matter as in claim 1 wherein the smoke suppressant is selected from the group consisting of magnesium carbonate, dawsonite, and mixtures thereof wherein the ratio of magnesium carbonate to dawsonite is at least 1:1.

8. A composition of matter as in claim 1 which further contains from 3 to 12 percent by weight of a brominated aromatic fire retardant additive.

9. A composition of matter as in claim 1 wherein the rubber component is a chlorinated rubber selected from the group consisting of polyepichlorohydrin, polychloroprene and chlorinated polyethylene rubbers.

10. A composition of matter comprising:
    A. from 61 to 90 percent by weight based on the total weight of the molding composition of a polyblend of:
       a. a matrix polymer of
          1. from 60 to 83 percent by weight of a styrene monomer selected from the group consisting of styrene, alpha-methyl styrene or chlorostyrene and mixtures thereof;
          2. from 7 to 20 percent by weight of a maleic anhydride monomer; and
          3. from 10 to 20 percent by weight of a brominated monomer selected from the group consisting of tribromophenyl acrylate, tribromophenyl methacrylate, tribromoneopentyl acrylate and tribromoneopentyl methacrylate, with the proviso that the amount of bromine in the polymer is at least 6 percent by weight; and
       b. a rubber component wherein the amoung of rubber in the polyblend is in the range of from 5 to 20 percent by weight based on the weight of the polyblend and is a chlorinated rubber selected from the group consisting of polyepichlorohydrin, polychloroprene and chlorinated polyethylene rubbers;
    B. from 4 to 12 percent by weight based on the total weight of the molding composition of brominated aromatic fire retardant additive;
    C. from 3 to 12 percent by weight based on the total weight of the molding composition of antimony oxide; and
    D. from 3 to 15 percent by weight based on the total weight of the molding composition of a smoke suppressant which is selected from the group consisting of magnesium carbonate, dawsonite and mixtures thereof wherein the ratio of magnesium carbonate to dawsonite is at least 1:1.

* * * * *